ns Patent Office
3,257,174
Patented June 21, 1966

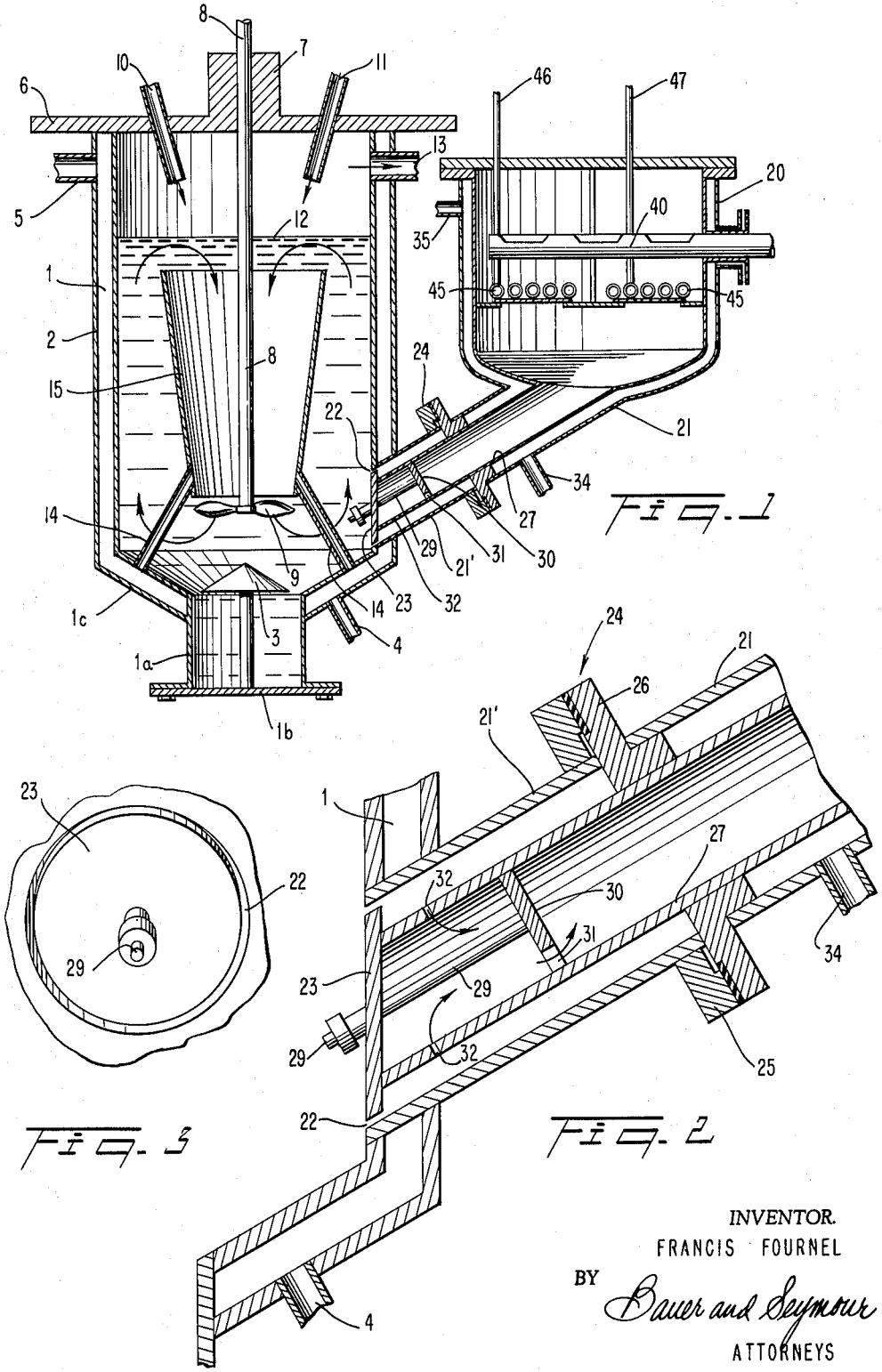

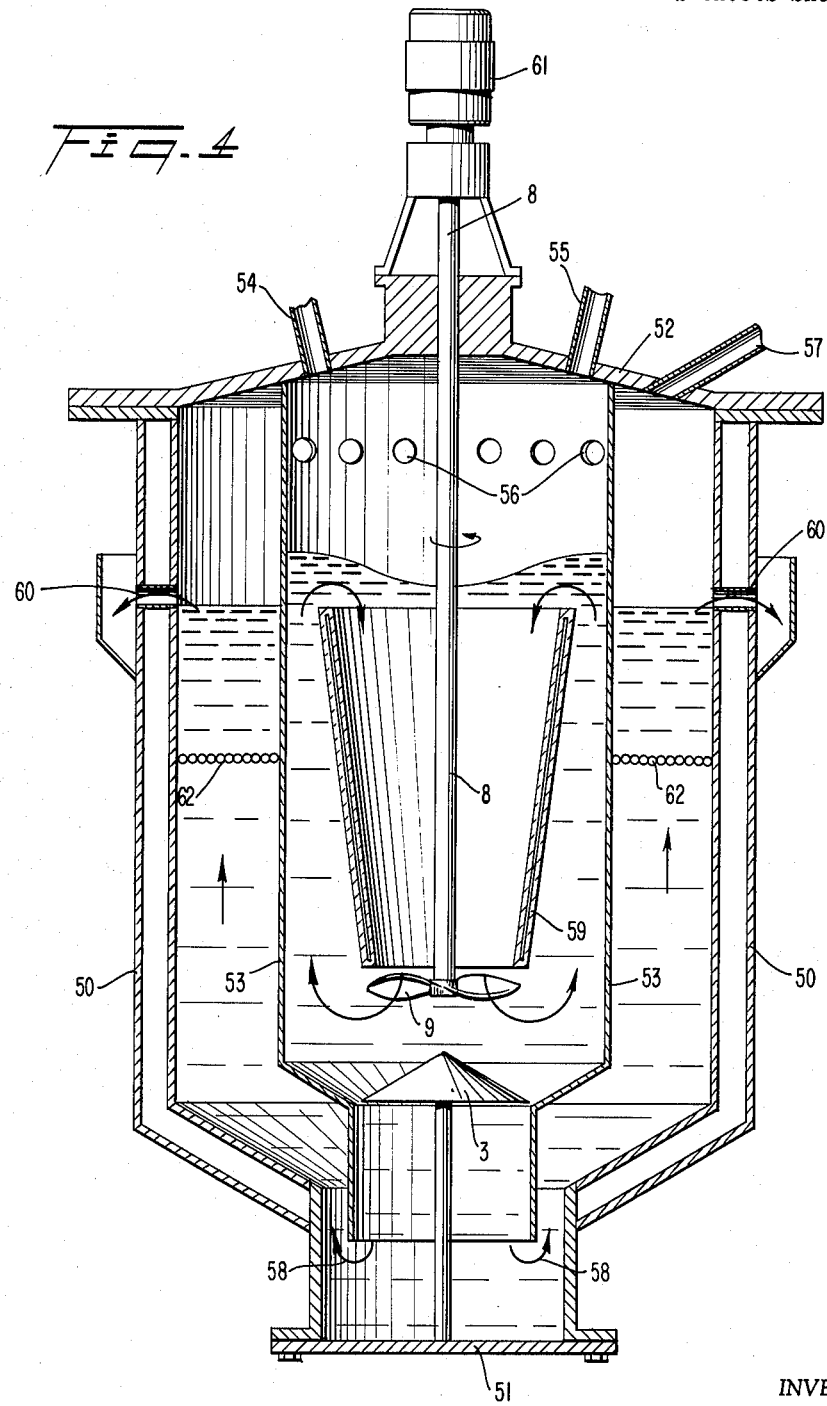

3,257,174
APPARATUS FOR PREPARING SULFUR
DIOXIDE
Francis Fournel, Paris, France, assignor to Compagnie
de Saint-Gobain, Neuilly-sur-Seine, France
Filed Oct. 10, 1962, Ser. No. 229,579
Claims priority, application France, Oct. 24, 1961,
876,870; Patent 1,311,317
9 Claims. (Cl. 23—285)

This invention relates to the preparation of sulfur dioxide and to the apparatus whereby the invention is carried out. It is an object of the invention to make sulfur dioxide, either pure or mingled with minor percentages of $SO_3$. The $SO_3$ can be readily removed by a known process which is simple, readily controlled, and efficient. Another object of the invention is to devise novel apparatus capable of contributing to the efficiency of the process.

The objects of the invention are accomplished, generally speaking, by a method of making $SO_2$ which comprises reacting sulfur with oleum at a temperature above the melting point of sulfur, and recovering the $SO_2$ formed by the reaction, and by apparatus for the manufacture of $SO_2$ comprising a reaction chamber, agitator means therefor, means to heat the contents thereof, means to admit reactants thereto, means to establish a liquid level therein, means to withdraw liquid therefrom, and means to cool the liquid withdrawn.

According to one of the characteristics of the process, molten elementary sulfur is admitted to a reactor containing oleum which is kept at a temperature such that the sulfur does not solidify, the reaction mass being maintained in constant and vigorous agitation. The novel design of the reactor contributes to the maintenance of this condition.

According to another characteristic of the invention, the reactor is continuously supplied with liquid sulfur and with oleum rich in $SO_3$ while an equal quantity of depleted oleum is withdrawn from the reaction mass for the extraction of the sulfur and the renewed enrichment with $SO_3$. Thus the process may be continuously operated using circulating oleum as the reaction medium.

According to another characteristic of the invention, the continuous withdrawal of oleum from the reaction mass, which contains unreacted sulfur in suspension, is carried out in a decanter which is connected with the reactor below the liquid level and is supplied with a slow flow which maintains the liquid level in the reaction chamber, discharges the depleted oleum, and returns sulfur by gravity into the reactor.

According to another characteristic of the invention, the decanter is supplied in advance of the overflow with refrigerating means which solidify the droplets of sulfur which have not yet reacted. The sulfur thus deposited may be freed by fusion and returned to the reactor as droplets.

In practice, the sulfur is introduced as a liquid into the reactor at a temperature between 125 and 155° C., preferably between 135 and 145° C. It falls into the oleum reaction mass which is at about 120° C. and is composed of oleum, liquid sulfur, and the products of their reaction. The $SO_2$ which is formed ascends and is released at the surface of the liquid to be withdrawn through a gas conduit provided for that purpose.

At the temperature of 120° the sulfur does not solidify but is dispersed as small droplets throughout the reaction mass by energetic agitation, reacting therein with the oleum to produce $SO_2$. A part of the reaction mass is delivered to a decanter which is in communication with part of the reactor below the liquid level. In order that the reaction shall be stopped in the decanter, the decanter is maintained at a temperature slightly below that of the reactor but sufficiently high to prevent the sulfur from solidifying. The decanter is provided with a cold surface placed below the overflow which collects and solidifies the sulfur which does not settle out at the temperature of the decanter. This solid sulfur is melted from time to time by heating the cold body on which the solid sulfur has collected, thus forming droplets which settle.

The above and further objects and novel features of the present invention will more fully appear from the following detailed description when the same is read in connection with the accompanying drawings. It is to be expressly understood, however, that the drawings are for the purpose of illustration only and are not intended as a definition of the limits of the invention, reference for this latter purpose being had primarily to the appended claims.

In the drawings, wherein like reference characters refer to like parts throughout the several views, FIG. 1 is a diagrammatic, vertical sectional view through a novel apparatus capable of carrying out the method;

FIG. 2 is an enlarged detail of the tube 21 in FIG. 1;

FIG. 3 is a face view of the baffle 23 taken from the left of FIG. 2; and

FIG. 4 is a modified form of novel apparatus.

Referring to FIGS. 1–3, the reaction vessel 1 has an encircling double-walled envelope 2 through which heating fluid can be passed from inlet 4 to outlet 5. The lower portion 1a of the reaction vessel is not jacketed for reason of simplicity of construction and is of materially reduced diameter. It is closed by a plate 1b which supports a baffle 3 of conical shape which cooperates with the section 1a, thus performing the function of deflecting descending currents toward the conical portion 1c of the vessel whence they are deflected upward, as shown by the arrows. The cover 6 is in tight sealing relation to the top of the vessel and is provided with a boss 7 through which passes the shaft 8 of an impeller 9 which can be driven to circulate the fluid in the vessel. The cover is also provided with ports 10 and 11 through which sulfur and oleum can be injected into the vessel. The liquid fills the vessel to a level 12 which is established by apparatus to be described. Above this liquid level there is an outlet 13 for gaseous products of the reaction which collect in the upper portion of the vessel. This reaction product is the $SO_2$, the preparation of which is desired, with some $SO_3$. The gases pass from pipe 13 to separating apparatus which is not a part of this invention and which is not shown.

Within the vessel, supports 14 fixed to the lower interior walls of the vessel carry an inverted frustrum of a cone 15, open at its upper and lower ends, of which the lower opening is adjacent the impeller 9. The operation of the impeller draws fluid down through the cone, projects it against the baffle 3 from whence it is deflected to the conical surfaces 1c and passes upward to enter the cone again, as shown by the arrows.

In the practice of the invention, the reaction mass will be kept at about 120° C., a convenient reacting temperature, the sulfur will be introduced at a temperature between 125° and 155° C., preferably above 135°, and the agitation will be as vigorous as is necessary for the efficient operation of the process. As the rates of admission of the reactants in a continuous flow process will depend upon the size of the reaction vessel, relative figures pertaining to this subject will be found in the examples.

A decanter 20 is attached to the reaction vessel by a tube 21 which extends at an angle which permits droplets of liquid sulfur to settle out and flow back toward the reaction vessel. The tube 21 is joined to the reaction vessel at 22, but this orifice is obstructed by a baffle 23. In actual manufacture, the reaction vessel is provided with a short tube 21' which is joined to the tube 21 by a tight joint 24 which includes a flange 25 soldered or otherwise attached to the tube 21' and a flange 26 which is attached to the end of tube 21. The baffle 23 is smaller than the opening 22 so that it permits the liquid in the vessel to extend into the space between the tube 21' and the inner wall 2 which forms an extension of the tube 21. Thus the tube 21' supports the entire decanter structure. The baffle 23 closes the end of the tube 27, being held against the end of the tube by means of a rod 29 which is carried by a prop 30 which contains a passageway 31 which is so located as to permit the flow of sulfur droplets toward the reaction vessel. Orifices 32 are provided in the wall of the extension 27 to permit the liquid reaction medium to enter the space between baffle 23 and prop 30 and to permit those droplets of sulfur which pass through passageway 31 to return to the reaction vessel. The decanter is provided with a double wall and with inlets and outlets 34, 35 for the flow of temperature controlling fluid. An overflow 40 is provided to establish the liquid level in the system. This consists of a horizontal pipe, with openings on top, through which the liquid in the system can escape, the escape taking place at the rate at which raw materials are admitted to the reaction vessel through inlets 10 and 11.

Beneath the overflow of the decanter 20 are located heat exchanging coils 45 which can be supplied with cooling (or, when necessary, heating) fluid through inlet and outlet 46, 47. This coil has windings which are close together on which any sulfur which reaches that level of the decanter solidifies. From time to time the cooling liquid in the coil is changed to heating liquid so as to liquefy the solidified sulfur and permit it to fall through the slow currents of oleum and return to the reaction vessel.

In FIG. 4 is a preferred embodiment of the apparatus, in which a vessel 50 having a fluid jacket for heat control, a bottom 51, and a cover 52 is provided with an interior coaxial cylindrical container 53 for the reaction mass of oleum and sulfur. Inlets 54 and 55 provide for the admission of oleum and sulfur. Apertures 56 provide for the escape, from above the liquid level, of the $SO_2$ which has been formed and pipe 57 provides for the release of the $SO_2$ from the surrounding chamber. The surrounding chamber has as its inner wall the container 53 and has as its outer wall the wall of the vessel. Between the walls 53 and 50 there is a space which is connected with the reaction chamber, as indicated by arrows 58. The reaction chamber is provided with a cone 59, which is of double walled construction providing for the flow of a heat fluid for the maintenance of proper reaction temperatures. Wall 50 has apertures 60 which establish a liquid level, and an impeller 9 driven by a motor 61 circulates the fluid against the conical baffle 3, as described in connection with FIG. 1. A heating or cooling coil 62 encircles the chamber between walls 53 and 50 and, being supplied with cooling water at adequate temperature, solidifies all sulfur which may be entrained in the reaction liquid which escapes from the decantation zone past the conical baffle 3. The sulfur may be collected on the lower surface of this coil, the tubes of which are quite close together, until a sufficient quantity has been collected to be returned to the bottom of the apparatus, whereupon the cooling water in the coil will be changed to steam, the sulfur becomes liquid, and droplets form and sink through the oleum in the outer chamber to the space above the bottom 51.

In operation, the sulfur and oleum are supplied at a rate which insures efficient reaction before they pass off, in FIG. 1 to the decanter and in FIG. 4 to the outer chamber, the liquid level being maintained by the overflow through element 40 of the decanter of FIG. 1 and through the aperture 60 in FIG. 4. Vigorous agitation is maintained at all times and the circulation of the fluid against the heated surfaces of the reaction chamber, for instance the outer wall of the chamber in FIG. 1 and the heated cone in FIG. 4, maintains the mass at optimum operating temperature while reacting the sulfur with the oleum. The depleted reaction mass of FIG. 1 makes its way into the decanter and in FIG. 4 into the external chamber in which cool surfaces extract the sulfur. The sulfur is extracted as a solid but can, from time to time, be made liquid and as such will form droplets which fall through the reaction liquid at a rate faster than the reaction liquid is proceeding toward the overflow.

The following examples illustrate the invention without limiting the generality of what has hereinabove been stated:

*Example 1*

Into a reactor of the type represented in FIG. 1, having a reaction chamber capacity of 80 liters, kept at 120° C. by appropriate heating of the wall, there are continuously introduced 8.3 kg. per hour of liquid sulfur at 145° C. and 284 kg. per hour of oleum containing 20% free $SO_3$. At the same time one extracts from the decanter 239.5 kg. of oleum titrating 5% free $SO_3$ which also contains about .5 kg. of $SO_2$. At the same time there is discharged from the top of the reaction chamber through orifice 13 49.5 kg. of $SO_2$ which contain 3.2 kg. of $SO_3$. The yield with respect to the sulfur included is on the order of 98%.

*Example 2*

In the same reactor maintained at 120° C., there is introduced 16.2 kg. per hour of sulfur and 284 kg. per hour of oleum containing 35% free $SO_3$. From the decanter there is extracted 195.4 kg. of oleum containing 5% free $SO_3$ and about 1 kg. of $SO_2$. The $SO_2$ withdrawn from the top of the reaction chamber is 96.4 kg. with which are entrained 8.5 kg. of $SO_3$. The yield remains in the neighborhood of 98%.

The advantages of the invention include a strict control of the process, using optimum temperatures of reaction, efficient reaction conditions, a high yield of $SO_2$, a continuous maintenance of optimum conditions of reaction, continuous withdrawal of depleted reactants, the continuous maintenance of reactive sulfur in the reaction zone and the constant gravity return of the sulfur entrained by depleted reaction products. The apparatus is novel and contributes to the efficient use of the process.

As many apparently widely different embodiments of the present invention may be made without departing from the spirit and scope thereof, it is to be understood that the invention is not limited to the specific embodiments.

What is claimed is:

1. Apparatus for the chemical reactions of a liquid and a molten, normally solid material such as sulfur for the production of gaseous products of reaction comprising a reaction chamber having inlets for supplying reactants to the chamber and an outlet for gaseous reaction products, means to circulate liquid in the chamber, means to heat the liquid in the chamber, overflow means establishing a liquid level in the chamber, conduit means to conduct liquid from the chamber to the overflow means, combined cooling and heating means having a surface in contact with liquid conducted through said conduit means, and means to alternately cool and heat said surface for successively solidifying on said surface, and then melting, normally solid material passing through said conduit means, said conduit means and surface being so placed that material melted by heating said surface will return by gravity to the chamber.

2. Apparatus for the continuous manufacture of $SO_2$ comprising a reaction chamber having inlets for sulfur and oleum and an outlet for $SO_2$ gas, means to heat the contents of the chamber to a temperature at which sulfur is liquid, means to circulate liquid in the chamber, means to establish a liquid level in the chamber below said outlet, conduit means to withdraw liqud from the chamber, and sulfur recovery means in said conduit means comprising combined cooling and heating means to successively solidify sulfur entrained in the withdrawn liquid and then melt the solidified sulfur, said conduit means and recovery means being arranged so that sulfur melted thereby returns by gravity to the chamber.

3. The apparatus of claim 2 in which said sulfur recovery means comprises combined cooling and heating means having a surface within said conduit means, means to cool said surface to a temperature at which liquid sulfur entrained in the withdrawn liquid solidifies, and means alternately to heat said surface to a temperature at which sulfur solidified thereon is melted.

4. The apparatus of claim 2 in which said means to circulate liquid in the chamber comprises a vertically aligned conduit within the chamber, said conduit being below said liquid level, and an impeller associated with the conduit to circulate liquid therethrough.

5. Apparatus for the manufacture of $SO_2$ comprising a reaction chamber having inlets for sulfur and oleum and an outlet for $SO_2$ gas, circulating means including a vertically aligned conduit within the chamber and an impeller associated with the conduit to circulate liquid therethrough, means to heat the contents of the chamber to a temperature at which sulfur is liquid, a container on a level with said chamber, an inclined conduit extending from the chamber upwardly to the container to conduct liquid from the chamber to the container, an overflow outlet arranged in the container to establish a liquid level in the chamber, the vertically aligned conduit in the chamber being below said liquid level, means to heat said inclined conduit and said container to a temperature at which sulfur is liquid, heat exchange means having a surface in the container below the overflow outlet, and means alternately to cool said surface to a temperature at which sulfur in a liquid in the container solidifies and then to heat the surface to a temperature at which sulfur liquifies.

6. Apparatus for the manufacture of $SO_2$ from oleum and molten sulfur comprising two concentrically vertically aligned chambers, means to introduce reactants to the inner chamber, the outer chamber having an outlet for liquid arranged to establish a liquid level in the chambers, means interconnecting the chambers above and below the liquid level, means to heat the contents of the chambers to a temperature at which sulfur is liquid, means to circulate liquid in the inner chamber, an outlet for $SO_2$ gas from the chambers, heat exchange means having a surface in the outer chamber below said liquid level and in the flow of liquid between said means which interconnect the chambers below the liquid level and said outlet for liquid, and means alternately to cool said surface to a temperature at which sulfur in said flow of liquid solidifies and then to heat the surface to a temperature at which sulfur liquifies.

7. The apparatus of claim 6 in which said means to circulate liquid in the inner chamber comprises a vertically aligned conduit within said chamber, said conduit being below said liquid level, and an impeller associated with the conduit to circulate liquid therethrough.

8. The apparatus of claim 7 including a conical baffle in the inner chamber below said conduit, said baffle being associated with said means which interconnect the chambers below the liquid level to deflect upward, descending currents of liquid being circulated in the inner chamber.

9. The apparatus of claim 7 in which said means to heat the contents of the chambers comprises heating means in the walls of the outer chamber and in the walls of said conduit.

References Cited by the Examiner
UNITED STATES PATENTS

| | | | |
|---|---|---|---|
| 1,404,709 | 1/1922 | Allbright | 23—285 |
| 1,896,483 | 2/1933 | Dohse | 23—177 |
| 2,031,939 | 2/1936 | Donlan. | |
| 2,240,618 | 5/1941 | Harris et al. | 23—285 |
| 2,363,834 | 11/1944 | Crater | 23—285 X |
| 2,502,490 | 4/1950 | Sweet | 23—285 |
| 2,813,006 | 11/1957 | Hayworth et al. | 23—177 |
| 3,028,227 | 4/1962 | Ballestra | 23—285 |

MORRIS O. WOLK, *Primary Examiner.*

MAURICE A. BRINDISI, DELBERT E. GANTZ,
*Examiners.*

E. J. MEROS, *Assistant Examiner.*